(12) United States Patent
Leiden et al.

(10) Patent No.: US 9,453,598 B2
(45) Date of Patent: Sep. 27, 2016

(54) COATED PIPE COMPRISING POLYOLEFIN LAYER WITH ENHANCED ADHESION

(75) Inventors: Leif Leiden, Anttila (FI); Jouni Purmonen, Porvoo (FI); Anders Leiden, Anttila (FI); Kauno Alastalo, Porvoo (FI)

(73) Assignee: Borealis Technology Oy, Forvoo (FI)

( * ) Notice: Subject to any disclaimer, the term of this patent is extended or adjusted under 35 U.S.C. 154(b) by 806 days.

(21) Appl. No.: 12/301,826

(22) PCT Filed: May 24, 2007

(86) PCT No.: PCT/EP2007/004633
§ 371 (c)(1),
(2), (4) Date: Mar. 13, 2009

(87) PCT Pub. No.: WO2007/137764
PCT Pub. Date: Dec. 6, 2007

(65) Prior Publication Data
US 2011/0217497 A1    Sep. 8, 2011

(30) Foreign Application Priority Data
May 26, 2006 (EP) .................................. 06010822

(51) Int. Cl.
| | | |
|---|---|---|
| B32B 15/02 | (2006.01) | |
| B32B 1/08 | (2006.01) | |
| B32B 27/32 | (2006.01) | |
| B32B 37/12 | (2006.01) | |
| F16L 9/147 | (2006.01) | |
| B32B 27/06 | (2006.01) | |
| F16L 58/04 | (2006.01) | |
| F16L 58/10 | (2006.01) | |
| B32B 15/08 | (2006.01) | |
| B32B 15/085 | (2006.01) | |
| B32B 15/18 | (2006.01) | |

(52) U.S. Cl.
CPC ............... *F16L 9/147* (2013.01); *B32B 1/08* (2013.01); *B32B 15/08* (2013.01); *B32B 15/085* (2013.01); *B32B 15/18* (2013.01); *B32B 27/06* (2013.01); *B32B 27/32* (2013.01); *F16L 58/04* (2013.01); *F16L 58/109* (2013.01); *B32B 2255/06* (2013.01); *B32B 2255/10* (2013.01); *B32B 2255/24* (2013.01); *B32B 2597/00* (2013.01); *Y10T 428/1359* (2015.01)

(58) Field of Classification Search
CPC ... C23C 2/38; C09J 123/06; C09J 123/0853; C09J 123/0869; C08L 35/00; C08L 31/04; B05D 7/146; B05D 7/14; Y10S 428/906; F16L 58/04; F16L 58/109; F16L 9/147; B32B 15/08; B32B 15/085; B32B 15/18; B32B 1/08; B32B 2255/06; B32B 2255/10; B32B 2255/24; B32B 2597/00; B32B 27/06; B32B 27/32; Y10T 428/1355; Y10T 428/1359; Y10T 428/1393; Y10T 428/269; Y10T 428/3154; Y10T 428/31681; Y10T 428/31692; Y10T 428/31728; Y10T 428/31732; Y10T 428/31746; Y10T 428/31757
USPC ............... 428/35.7, 35.8, 36.9, 36.91, 39.92; 427/384, 409, 532; 106/14.05; 156/219
See application file for complete search history.

(56) References Cited

U.S. PATENT DOCUMENTS

| | | | |
|---|---|---|---|
| 3,236,917 A | | 2/1966 | Natta et al. |
| 4,077,098 A | * | 3/1978 | Ayusawa et al. ............. 29/33 J |
| 4,351,876 A | | 9/1982 | Doi et al. |
| 4,592,960 A | * | 6/1986 | Inoue et al. ................. 428/461 |
| 4,639,495 A | | 1/1987 | Waggoner |
| 4,654,262 A | | 3/1987 | Alonso |
| 4,950,541 A | | 8/1990 | Tabor et al. |
| 5,194,509 A | | 3/1993 | Hasenbein et al. |
| 5,759,629 A | | 6/1998 | Van Ooij et al. |
| 6,030,672 A | * | 2/2000 | Usui ............................ 428/35.8 |
| 6,503,989 B1 | * | 1/2003 | Hruska ..................... 525/333.7 |
| 6,894,115 B2 | * | 5/2005 | Botros ......................... 525/101 |
| 7,064,163 B2 | * | 6/2006 | Shida ............................. 525/70 |
| 2005/0025922 A1 | * | 2/2005 | Rydin et al. ............... 428/36.91 |

FOREIGN PATENT DOCUMENTS

| | | |
|---|---|---|
| CN | 1105052 | 11/1993 |
| DE | 27 40 233 | 3/1978 |
| DE | 26 50 18 | 4/1989 |

(Continued)

OTHER PUBLICATIONS

Adhesive Properties of Ethylene-Vinyl Silane (EVS) and Ethylene-Vinyl Acetate-Vinyl Silane (EVAVS) Moisture Crosslinkable Polymers, by Alex Henderson, 1994 Hot Melt Symposium, pp. 81-93.*

(Continued)

*Primary Examiner* — Yan Lan
(74) *Attorney, Agent, or Firm* — Fay Sharpe LLP

(57) ABSTRACT

The present invention relates to a structure comprising (i) a layer or profile (A) composed of a first material, and (ii) a polyolefin layer or profile (B) adjacent to layer or profile (A) which is composed of a composition comprising a base resin comprising a polyolefin, characterized in that the surface of any or both of layer or profile (A) and layer or profile (B) has/have been treated with a composition comprising an organosilicon compound before (A) and (B) are brought adjacent to each other, to a process for the production of such a structure, to an article, in particular a coated pipe, comprising such a structure and to the use of a composition comprising an organosilicon compound as an adhesion promoter in such a structure.

11 Claims, No Drawings

(56) References Cited

FOREIGN PATENT DOCUMENTS

| | | |
|---|---|---|
| DE | 26 50 118 | 4/1989 |
| DE | 10062272 | 6/2002 |
| GB | 1 522 236 | 8/1978 |
| GB | 1 591 057 | 6/1981 |
| GB | 2 341 434 | 3/2000 |
| JP | 62-044439 | 2/1987 |
| JP | 10315390 | 12/1998 |
| WO | WO 88/05449 | 7/1988 |
| WO | WO 99/37730 | 7/1999 |
| WO | WO 01/53367 | 7/2001 |
| WO | WO 03/046101 | 6/2003 |

OTHER PUBLICATIONS

International Search Report dated Aug. 24, 2007 for International application No. PCT/EP2007/004633.
Written Opinion of the International Searching Authority dated Aug. 24, 2007 for International application No. PCT/EP2007/004633.
Response to Written Opinion of the International Searching Authority dated Feb. 18, 2008 for International application No. PCT/EP2007/004633.
International Preliminary Report on Patentability dated Sep. 24, 2008 for International application No. PCT/EP2007/004633.

* cited by examiner

COATED PIPE COMPRISING POLYOLEFIN LAYER WITH ENHANCED ADHESION

The present invention relates to a structure comprising a layer or profile (A) composed of a first material and a polyolefin layer or profile (B) adjacent to layer or profile (A) which is composed of a composition comprising a polyolefin. Furthermore, the invention relates to a process for the production of such a structure, to an article, in particular a coated pipe, comprising such a structure and to the use of a composition comprising an organosilicon compound as an adhesion promoter in such a structure.

Structures comprising two, three, four, five or more layers at least one of which being a polyolefin layer are known for many applications such as the protective coating of pipes. In the production of structures comprising a polyolefin layer/profile it is a known difficulty that the adhesion between the polyolefin layer/profile and a further layer/profile composed either of the same or a different polyolefin composition or a different material such as metal is not too good, so that usually the adhesion between the layers/profiles must be improved, e.g. by the use of an intermediate layer, to avoid delamination, i.e. unwanted separation of the layers/profiles.

For example, in the coating of metal, especially steel, pipes usually three polymer layers are applied on a metal wall. The structure usually comprises an epoxy layer which is designed to firmly adhere to the outer surface of the metal (steel) wall of the pipe, an intermediate layer and an outer polyolefin protective layer which usually comprises a high density polyethylene or polypropylene. The epoxy layer is needed in this structure in particular to provide an improved adhesion of the polymeric layers to the metal and also for corrosion protection of the metal. The outer protective polyolefin layer is needed mainly to provide good mechanical protection and less water penetration. Finally, the intermediate layer, which usually also comprises a polyolefin, is needed to provide good adhesion between the epoxy layer and outer polyolefin layer.

It is one drawback of this conventional structure for coated pipes that an epoxy layer is used because, first, the processing window of epoxy resins can be very narrow which leads to enhanced production requirements and often to failures in the coating. Second, it is known that epoxy layers are very brittle, especially at high glass transition temperatures, and, third, that epoxy resins are expensive.

It is therefore an object of the present invention to provide a structure including a layer/profile made of a polyolefin composition, in particular a structure for a coated metal pipe, which without the use of an epoxy layer has a sufficiently good adhesion between the polyolefin layer/profile and the layer/profile the polyolefin layer is laminated on.

It has now surprisingly been found that this object can be achieved by treating the surface of the layer/profile supposed to be adjacent to the layer made of the polyolefin composition and/or the surface of the layer made of the polyolefin composition with a composition comprising an organosilicon compound before laminating the polyolefin layer/profile on the other layer/profile.

Therefore, the present invention provides a structure comprising
  (i) a layer or profile (A) composed of a first material, and
  (ii) a polyolefin layer or profile (B) adjacent to layer or profile (A) which is composed of a composition comprising a base resin comprising a polyolefin,
characterized in that the surface of any or both of layer or profile (A) and layer or profile (B) has/have been treated with a composition comprising an organosilicon compound before (A) and (B) are brought adjacent to each other.

It is an advantage of the present invention that due to the mentioned treatment with a composition comprising an organosilicon compound, the adhesion between a polyolefin layer/profile (B) and a further layer/profile (A) to be made adjacent to each other is highly improved. It is thus possible to provide structures including polyolefin layers/profiles which have an increased resistance to delamination or shielding and hence e.g. an increased lifetime.

It is also possible, e.g. in the production of coated metal pipes, to omit adhesion promoting layers, in particular epoxy layers, and still obtain a sufficiently high or even better degree of adhesion between the metal and the polyolefin layer. The omission of an epoxy layer furthermore facilitates the production of such pipes because the processing and operating window is significantly broadened which yields a more robust system. Furthermore, costs are significantly reduced.

Still further, by applying the finding of the invention it is possible to provide a so-called stand alone polyolefin coated pipe, which means a pipe which apart from the inner metal wall has only one further outer polyolefin layer.

It is a further advantage of the present invention that especially in the production of coated steel pipes the treatment of the steel surface with a chromate solution which has hitherto been used for corrosion inhibition can be avoided because the treatment with the composition comprising an organosilicon compound provides corrosion resistance. Thus, the use of poisonous and even carcinogenic chromates is no longer necessary.

Structures in accordance with the present invention may also be, for example, such structures comprising a barrier layer e.g. made of aluminium and a polyolefin layer, a metal sheet coated with a polyolefin layer (roofing), a metal profile coated with a polyolefin layer, or a structure comprising different polyolefin layers/profiles, e.g. a polyethylene and a polypropylene layer/profile.

Bringing adjacent to each other layers/profiles (A) and (B) can be achieved by any process known in the art, as e.g. lamination, co-extrusion or welding. For example, if layer/profile (A) is composed of a metal, a polyolefin layer/profile may be formed thereon by extrusion, injection moulding etc.

Where herein the term "polyolefin" is used, olefin homo- and/or copolymers are meant which also may bear further groups such as polar groups.

The composition which polyolefin layer or profile (B) is composed of comprises a base resin which comprises a polyolefin. The term "base resin" is intended to cover all polymeric components which composition (B) is composed of.

The organosilicon compound as such and also the composition comprising the organosilicon compound which is used for the treatment of the surface of layer/profile (A) and/or (B) preferably are free of compounds containing epoxy groups.

The organosilicon compound preferably is a non-polymeric compound.

The polyolefin composition which polyolefin layer/profile (B) is composed of preferably is free of any compounds containing epoxy groups.

Furthermore, also the material, in particular metal, layer/profile (A) is composed of preferably is free of any compounds containing epoxy groups.

Preferably, layer/profile (A) is composed of a polymer composition, glass, a metal or a metal alloy, more preferably is composed of a metal or a metal alloy.

It is preferred that layer/profile (A) has been treated with said composition comprising an organosilicon compound before (A) and (B) are brought adjacent to each other. This is particularly preferred if the layer/profile (A) is composed of a metal or metal alloy because, as mentioned above, treatment with said composition comprising an organosilicon compound also provides corrosion inhibition.

It is furthermore preferred that only layer/profile (A) has been treated with said composition comprising an organosilicon compound before (A) and (B) are brought adjacent to each other.

The composition used for the treatment of layer/profile (A) and/or (B) may comprise a single organosilicon compound but also a mixture of two or more of these compounds. This applies also for all preferred embodiments of the organosilicon compound.

Preferably, the organosilicon compound comprises one or more hydrolysable groups which after hydrolyses yield silanol groups, i.e. SiOH groups.

More preferably, the unhydrolysed organosilicon compound comprises the structural element:

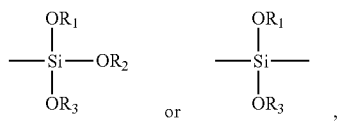

wherein $R_1$, $R_2$, and $R_3$, independently are selected from alkyl, preferably methyl, ethyl or propyl, groups and acetyl. The organosilicon compound may comprise one or more of these structural elements Examples for such compounds include hydrocarbyl-, preferably alkyl-, trialkoxysilanes, preferably hydrocarbyl trimethoxy-, triethoxy-, or tripropoxysilanes, such as methyl trimethoxysilane, methyl triethoxysilane, ethyl trimethoxysilane, ethyl triethoxysilane, n-propyl trimethoxysilane, n-propyl triethoxysilane, i-butyl trimethoxysilane, i-butyl triethoxysilane, octyl trimethoxysilane, octyl triethoxysilane, hexadecyl trimethoxysilane, and hexadecyl triethoxysilane; trialkoxysilanes with amine and/or sulphur functionalities, such as 3-aminopropyltriethoxysilane, and thio[bis-(propylene-3-trimethoxysilane)]; trialkoxysilanes with (meth)acrylate functionality, such as gamma-methacryloxypropyl trimethoxysilane; and oligomeric silanes based on e.g. tetramethyl silicate or tetraethyl silicate.

The organosilicon compound may also comprise one or more groups having carbon-carbon double bonds, i.e. alkenyl groups.

Preferably, the organosilicon compound is a hydrolysed vinyl silane, more preferably is a hydrolysed vinyl silane having the structural element

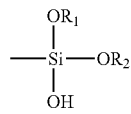

at one terminus and a vinyl group at the opposite terminus, wherein $R_1$ and $R_2$ are each chosen from the group consisting of hydrogen, alkyl, preferably methyl, ethyl and propyl, and acetyl.

As a precursor for the above mentioned preferred compounds comprising one or more SiOH groups, unhydrolysed silanes can be used. Preferably, unhydrolysed vinyl silanes are selected so that hydrolysed vinyl silanes, preferably those hydrolysed vinyl silanes denoted above as more preferred embodiment, are obtained upon hydrolyses.

Still more preferably, the unhydrolysed vinyl silanes are selected from the group consisting of

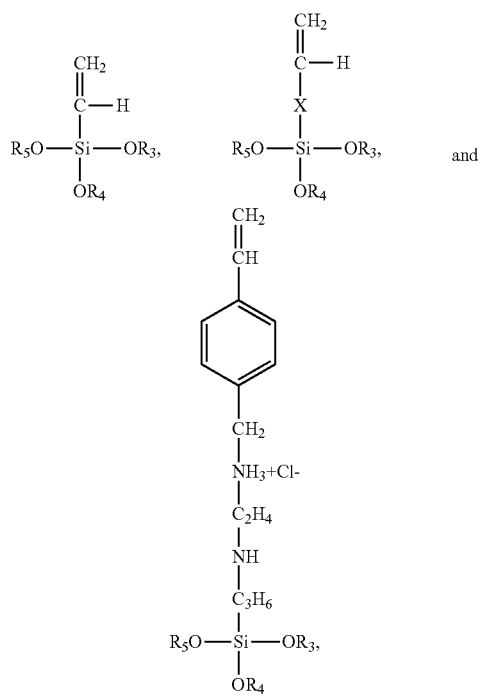

wherein X is an alkyl group, and $R_3$, $R_4$ and $R_5$ are each chosen from the group consisting of $C_1$ to $C_4$ alkyl, and acetyl. More preferably, X is an $C_1$ to $C_{10}$ alkyl.

In particular, the unhydrolysed vinyl silane may be selected from the group consisting of vinyl trimethoxysilane, vinyl triethoxysilane, vinyl tripro-poxysilane, vinyl triisopropoxysilane, vinyl tributoxysilane, vinyl tri-acetoxysilane, vinylmethyl trimethoxysilane, vinylethyl trimethoxysilane, vinylpropyl trimethoxysilane, and N-[2-(vinylbenzylamino)-ethyl]-3-aminopropyl trimethoxysilane.

Such organosilicon compounds are, for example, disclosed in U.S. Pat. No. 5,759,629. The disclosure in this document is incorporated herein in its entirety. In particular, it is explicitly referred to all embodiments and preferred embodiments for the organosilicon compounds, in particular the embodiments of the hydrolysed vinyl silanes and the unhydrolysed vinyl silanes, disclosed in this document, whether or not already described herein.

Preferably, treatment of the surface of layer/profile (A) and/or layer/profile (B) comprises applying a solution, usually a hydrous solution, of the organosilicon compound(s) to the surface.

Preferably, the total concentration of unhydrolysed vinyl silanes used to prepare the treatment solution is 4 vol. % or higher, based on the total volume of solution components. More preferably, the concentration of the solution is from 5 to 20 vol. %.

Apart from the organosilicon compound(s) and, preferably, water the solution may optionally also comprise at least one alcohol which may be chosen from the group of: methanol, ethanol, propanol, butanol and isomers thereof.

Preferably, the pH value of the solution is from 3 to 8, more preferably from 4 to 6.

It is again explicitly referred to U.S. Pat. No. 5,759,629, as concerns the application of the solution, and to all preferred embodiments given therein.

In a preferred embodiment, the solution is sprayed onto the cold surface of the layer/profile to be treated. In particular when applied to a metal layer/profile, the layer/profile may then be heated, e.g. by inductive heating, preferably to a temperature of 50 to 300° C., more preferably 60 to 200° C. to decrease the drying time.

In a preferred embodiment of the structure according to the invention, the polyolefin of the composition layer or profile (B) is composed of comprises adhesion promoting groups.

Preferably, the adhesion promoting groups are polar groups.

Polyolefins with adhesion promoting, preferably polar, groups may e.g. be prepared by copolymerisation of olefin monomers with comonomer compounds bearing such groups or by grafting of appropriate compounds onto the polyolefin backbone after the polyolefin has been produced.

If copolymerisation is used for the production of the polyolefin with adhesion promoting groups, it is preferred that a polar copolymer is produced which comprises a copolymer of ethylene with one or more comonomers selected from $C_1$- to $C_6$-alkyl acrylates, $C_1$- to $C_6$-alkyl methacrylates, hydroxy functional monomers, anhydride functional monomers, e.g. 2-hydroxyethyl (meth-)acrylate, acrylic acids, methacrylic acids, vinyl acetate and vinyl silanes. For example, the polar copolymer may also be a terpolymer of ethylene, one of the above mentioned monomers and a vinyl silane. The copolymer may also contain ionomeric structures (like in e.g. DuPont's Surlyn types).

If grafting is used to obtain the polyolefin with adhesion promoting groups, as grafting agent, any such agent can be used which is known to be suitable for this purpose by the person skilled in the art.

Preferably, the acid grafting agent is an unsaturated carboxylic acid or a derivative thereof such as anhydrides, esters and salts (both metallic or non-metallic). Preferably, the unsaturated group is in conjugation with the carboxylic group.

Examples of such grafting agents include vinyl silanes, acrylic acid, methacrylic acid, fumaric acid, maleic acid, nadic acid, citraconic acid, itaconic acid, crotonic acid, and their anhydrides, metal salts, esters amides or imides.

The preferred grafting agents are maleic acid, its derivatives such as maleic acid anhydride, and in particular maleic acid anhydride.

Grafting can be carried out by any process known in the art such as grafting in an melt without a solvent or in solution or dispersion or in a fluidised bed. Preferably, grafting is performed in a heated extruder or mixer as e.g. described in U.S. Pat. No. 3,236,917, U.S. Pat. No. 4,639,495, U.S. Pat. No. 4,950,541 or U.S. Pat. No. 5,194,509. The contents of these documents is herein included by reference. Preferably, grafting is carried out in a twin screw extruder such as described in U.S. Pat. No. 4,950,541.

Grafting may be carried out in the presence or absence of a radical initiator but is preferably carried out in the presence of a radical initiator such as an organic peroxide, organic perester or organic hydroperoxide.

Preferably, the polar groups in the polyolefin are selected from acrylates, e.g. methylacrylates, methylmethacrylates, propylacrylates, butylacrylates, carboxylic acids such as maleic acid and amines.

The base resin of the polyolefin composition which layer or profile (B) is composed of may either comprise one type of polyolefin or a mixture of two or more types of polyolefins.

The adhesion promoting groups may be present in one, several or all polyolefin(s) present in the polyolefin composition.

Preferably, the amount of adhesion promoting groups in the polyolefin composition is from 0.01 to 5.0 mol. %, more preferably 0.02 to 1.0 mol. %, based on the total amount of olefin monomers in the polyolefin composition.

Furthermore, preferably, the polyolefin of the base resin of composition layer/profile (B) is composed of is an ethylene homo- or copolymer and/or a propylene homo- or copolymer or any mixture thereof.

It is preferred that the total amount of polyolefins in the base resin of polyolefin composition layer/profile (B) is composed of is 90 wt. % or more.

Usual additives such as stabilizers may be present in the polyolefin composition in an amount of up to 10 wt. %, more preferably up to 5 wt. %, and still more preferably up to 1 wt. %.

However, in the embodiment of filled polyolefins it is also possible that the composition comprises a filler material in an amount of up to 70 wt. %. The base resin then preferably makes up an amount of 25 wt. % or more.

The present invention also relates to a process for the production of a structure characterized in that the surface of a layer or profile (A) composed of a first material and/or the surface of a polyolefin layer or profile (B) composed of a composition comprising a polyolefin is/are treated with a composition comprising an organosilicon compound before layer/profile (A) and layer/profile (B) are brought adjacent to each other.

Still further the invention relates to an article which comprises the structure in any of the embodiments described before.

In a particularly preferred embodiment, the structure according to the invention is a coated pipe, more preferably a coated metal pipe wherein layer/profile (A) is composed of a metal/metal alloy in the form of an inner tube/pipe. On the outer surface of said pipe/tube is formed a polyolefin layer after the outer surface of (A) has been treated with the composition comprising an organosilicon compound.

Furthermore, for such a coated metal pipe, two embodiments are preferred.

In a first embodiment, on the outer surface of the inner metal wall an intermediate polyolefin adhesive layer is formed on which, in turn an outer protective polyolefin layer is formed.

Compositions for such polyolefin adhesive layers are disclosed e.g. in WO 99/37730 or WO 03/046101. The content of these documents is incorporated herein in its entirety.

In a second embodiment, the coated pipe is a so called stand alone polyolefin coated pipe which means that on the outer surface of the inner metal wall the outer protective polyolefin layer is formed directly.

In this embodiment, it is preferred that the polyolefin composition the protective polyolefin layer is composed of comprises adhesion promoting groups in the composition in an amount of from 0.01 to 1.0 wt. %.

In all embodiments of coated metal pipes it is especially preferred that layer/profile (A) composed of a metal/metal alloy has been treated with said composition comprising an organosilicon compound before layer/profile (B) is formed thereon.

The present invention further relates to the use of a composition comprising an organosilicon compound as an adhesion promoter in a structure comprising a layer/profile composed of a composition comprising a polyolefin, in particular in any of the structures described hereinbefore

EXPERIMENTAL AND EXAMPLES

1. Definitions and Measurement Methods a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene and at 230° C. for polypropylene. It may be determined at different loadings such as 2.16 kg ($MFR_2$), 5 kg ($MFR_5$) or 21.6 kg ($MFR_{21}$).

b) Peel Strength

Adhesion of polymer on steel was tested by Instron 1122 peel strength test equipment according to DIN 30670. A strip of 3 cm width is cut of the coating layer. The other end of the strip is fastened to pulling equipment and the pulling strength is measured during the peeling of the strip from the steel with a pulling speed of 10 mm/min. The results are expressed as N per cm.

2. Structures Produced

Different coated steel pipe structures were produced according to the following procedure:

Coating was carried out at a steel pipe coating pilot line which is a continuous side extrusion line consisting of a pipe transportation system, induction oven, epoxy spraying unit, extruder for adhesion polymer, extruder for top layer and cooling bath.

Steel pipes used in the steel pipe coating line are 1 m long and 100 mm in diameter.

Example 1

Comparative

A clean steel grit blasted steel pipe was set on the rolling transportation band. The pipe surface was heated up to 180 to 220° C. in induction oven in few seconds residence time.

An epoxy layer (Scotchkote 226N from 3M) was then added on the hot outer pipe surface. The thickness of the epoxy layer was 120 micrometer.

Then, an adhesion polypropylene layer was side extruded at a temperature of 200° C. onto the epoxy layer. This adhesion layer was made of a propylene heterophasic copolymer composition, consisting of 80 wt. % non-grafted heterophasic propylene copolymer ($MFR_2$ (230° C., 2.16 kg)=3.5 g/10 min, rubber content: 14 wt. %, ethylene content in rubber: 35 wt. %) and 20 wt. % of the same heterophasic propylene copolymer which had been grafted in a compounding line at 200° C. with peroxide and maleic acid anhydride so as to obtain a maleic acid anhydride content in the product of 0.7 wt. % and an $MFR_2$ (230° C., 2.16 kg) of 50 g/10 min. The final propylene heterophasic copolymer composition had a maleic acid anhydride content of 0.14 wt. % and an $MFR_2$ (230° C., 2.16 kg) of 8 g/10 min. The thickness of the adhesion layer was 200 micrometer.

In next stage, a polypropylene top layer made of a further heterophasic propylene copolymer ($MFR_2$ (230° C., 2.16 kg)=0.9 g/10 min, rubber content 13 wt. %, total ethylene content 9 wt. %) was extruded at a temperature of 220° C. on the adhesion layer and the coated pipe was cooled down in water cooling bath. The thickness of the coating layer was 3.3 millimeter.

Example 2

A clean steel grit blasted steel pipe (same as in Comparative Example 1) was set on the rolling transportation band. The outer pipe surface was wetted by spraying with 10% organic silane-water solution (Oxsilan MM-0705, available from Chemetall). The steel surface was then heated up to 160° C. and the surface was dried before extruding the adhesion layer. The thickness of the so obtained layer was 10 micrometer.

Extrusion of the adhesion layer and the top coat layer was performed as in Comparative Example 1.

Example 3

Comparative

Extrusion of an adhesion layer and a top coat layer was carried out as in the previous examples, but before neither an organic silane nor an epoxy layer had been added onto the pipe surface.

Example 4

A clean steel grit blasted steel pipe was set on the rolling transportation band. The pipe surface was wetted by spraying with 10% organic silane-water solution (Oxsilan MM-0705, available from Chemetall). The steel surface was then heated up to 160° C. and the surface was dried. The thickness of the so obtained layer was 10 micrometer.

Then, an adhesion polyethylene layer was side extruded at 200° C. The polyethylene used was an medium density maleic anhydride grafted polyethylene composition (d=934 kg/m³, $MFR_2$ (190° C., 2.16 kg)=1.5 g/10 min, maleic acid content: 0.5 wt. %, ethylene butylacrylate content: 6 wt. %, described as Composition 3 in the examples of EP 1 316 598).

In next stage, a polyethylene top layer made of a high density polyethylene (d=953 kg/m³, $MFR_2$ (190° C., 2.16 kg)=0.5 g/10 min, described as polyethylene #3 in the examples of EP 837 915) was side extruded on the adhesion layer at a temperature of 220° C. and the coated pipe was cooled down in water cooling bath.

Example 5

Comparative

Coating was carried out as in Example 4 apart from the fact that no treatment of the steel surface with an organic silane solution was applied.

3. Peel Strength Test Results

The results of the peel strength tests for the coated pipes of Examples 1 to 5 are given in Table 1 below:

TABLE 1

| | Peel strength, N/cm at | | | |
|---|---|---|---|---|
| | 23° C. | 80° C. | 110° C. | 140° C. |
| Example 1 (Comparative) | 441 | 202 | 82 | — |
| Example 2 | 442 | 174 | 117 | 45 |
| Example 3 (Comparative) | 71 | 41 | — | — |
| Example 4 | 220 | 70 | | |
| Example 5 (Comparative) | 70 | 30 | | |

As can be seen from the results given in Table 1, pretreatment of the pipe steel surface with the organic silane gave the same adhesion results at lower temperatures and even better adhesion results at higher temperature in the propylene coating system than coating with epoxy alone, and much better adhesion than without any treatment/epoxy layer (see Comparative Examples 1, 3 and Example 2).

Furthermore, using the organo silane treatment gave also clear improvement in adhesion for a polyethylene coating (Example 4 and Comparative Example 5).

The invention claimed is:

1. A structure consisting of
   (i) a layer or profile (A) comprising a metal or metal alloy, and
   (ii) a polyolefin layer or profile (B) adjacent to layer or profile (A) which comprises a composition comprising a base resin comprising a polyolefin,
   characterized in that the surface of layer or profile (A) has been treated with a composition comprising an organosilicon compound before (A) and (B) are brought adjacent to each other; and
   wherein the polyolefin of the composition layer or profile (B) comprises from 0.02 to 1.0 mole % of adhesion promoting groups; wherein the structure is a pipe; and wherein the polyolefin of the composition layer or profile (B) is a terpolymer of ethylene, a vinyl silane, and a monomer selected from the group consisting of an anhydride functional monomer and maleic anhydride.

2. A structure according to claim 1 wherein the organosilicon compound comprises one or more hydrolysable groups which after hydrolysis yield silanol groups.

3. A structure according to claim 2 wherein the organosilicon compound comprises the structural element:

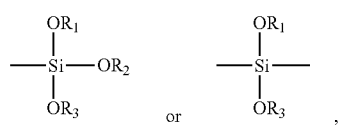

wherein $R_1$, $R_2$, and $R_3$, independently are selected from alkyl groups and acetyl groups.

4. A structure according to claim 1 wherein the treatment of the surface of layer or profile (A) comprises applying a solution of the organosilicon compound to the surface.

5. Coated pipe according to claim 1 wherein layer/profile (A) of the multilayer structure comprises steel and has an outer surface which has been treated with said composition comprising an organosilicon compound before (A) and (B) are brought adjacent to each other.

6. The structure of claim 1, wherein the metal alloy is steel.

7. Process for the production of a pipe characterized in that the surface of a layer or profile (A) composed of a metal or metal alloy is treated with a composition comprising an organosilicon compound before (A) and a polyolefin layer or profile (B) comprising a composition comprising a polyolefin are brought adjacent to each other; wherein the structure consists of layer or profile (A) and polyolefin layer or profile (B); and wherein the polyolefin of the composition layer or profile (B) comprises from 0.02 to 1.0 mole % of adhesion promoting groups; and wherein the polyolefin of the composition layer or profile (B) is a terpolymer of ethylene, a vinyl silane, and a monomer selected from the group consisting of an anhydride functional monomer and maleic anhydride.

8. The process of claim 7, wherein the metal alloy is steel.

9. A structure consisting of
   a. a layer or profile (A) comprising a metal or metal alloy, and
   b. a polyolefin layer or profile (B) adjacent to layer or profile (A) which comprises a composition comprising a base resin consisting of a polyolefin,
   characterized in that the surface of layer or profile (A) has been treated with a composition comprising an organosilicon compound before (A) and (B) are brought adjacent to each other; and
   wherein the polyolefin of the composition layer or profile (B) comprises from 0.02 to 1.0 mole % of adhesion promoting groups; wherein the structure is a pipe; and wherein the polyolefin of the composition layer or profile (B) is a terpolymer of ethylene, a vinyl silane, and a monomer selected from the group consisting of a $C_1$-$C_6$ alkyl acrylate, a $C_1$-$C_6$ methyacrylate, a hydroxyl functional monomer, an anhydride functional monomer, an acrylic acid, a methacrylic acid, and vinyl acetate.

10. The pipe of claim 9, wherein the monomer is maleic anhydride.

11. The pipe of claim 9, wherein the metal alloy is steel.